A. L. HARDISTY.
ANTISLIPPING OVERSHOE FOR HORSES.
APPLICATION FILED DEC. 18, 1911.
1,023,845.
Patented Apr. 23, 1912.
2 SHEETS—SHEET 1.
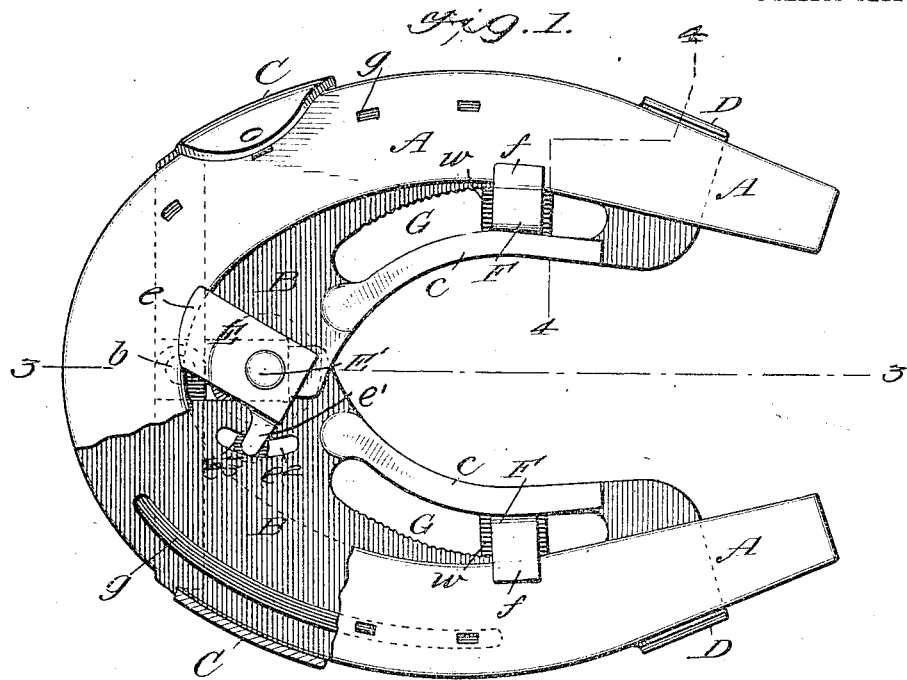
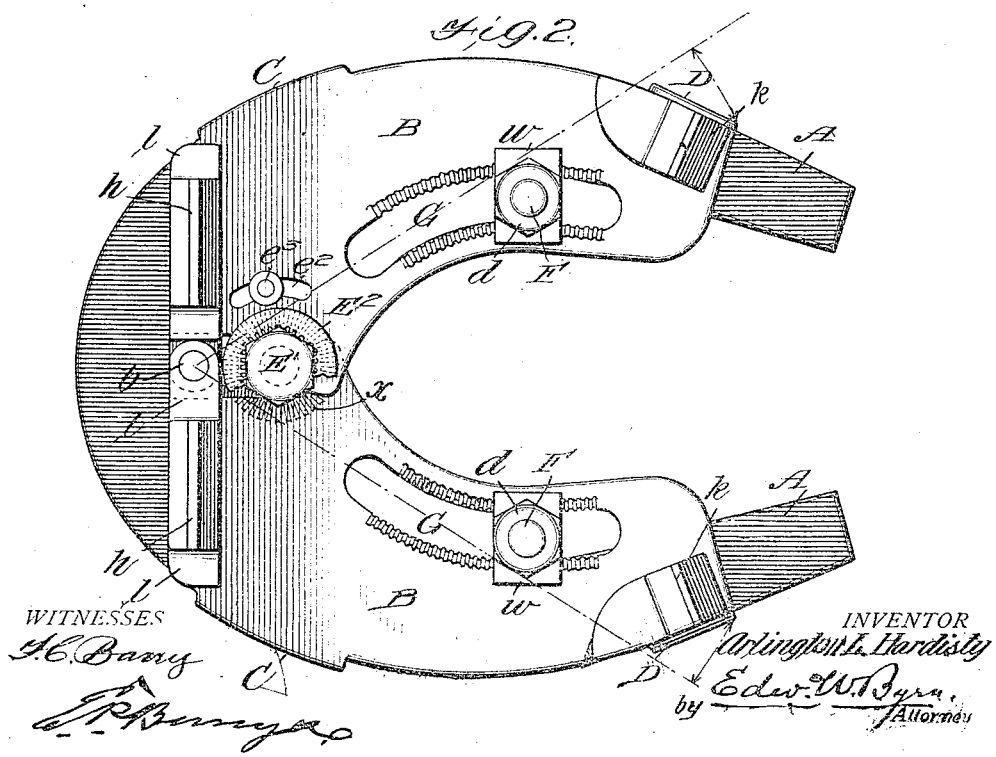
WITNESSES
INVENTOR
Arlington L. Hardisty
by Edw. W. Byrn.
Attorney A. L. HARDISTY.
ANTISLIPPING OVERSHOE FOR HORSES.
APPLICATION FILED DEC. 18, 1911.
1,023,845.
Patented Apr. 23, 1912.
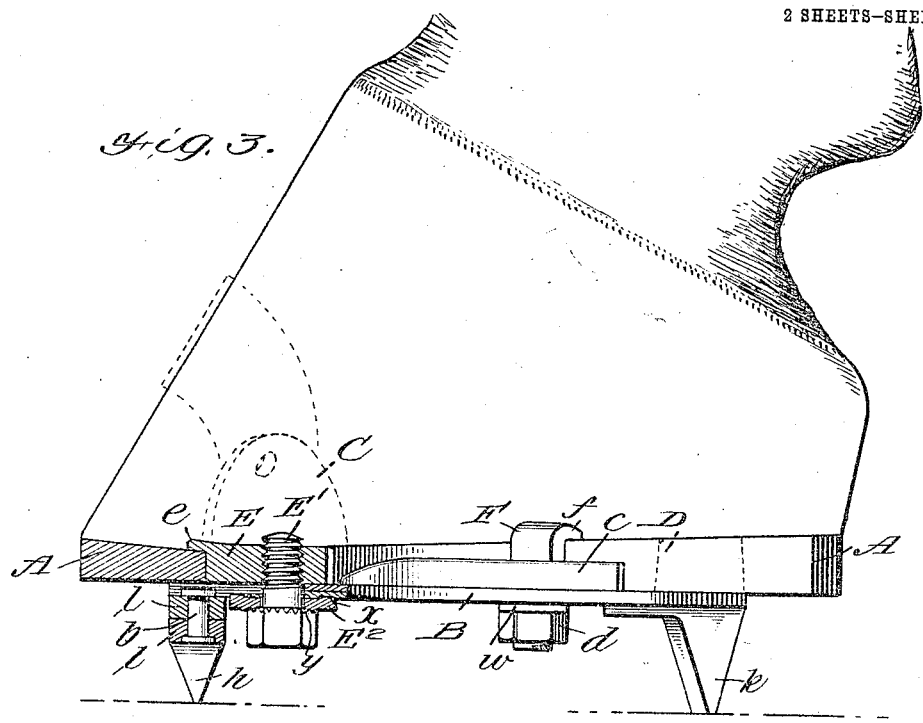
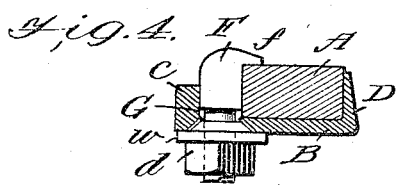
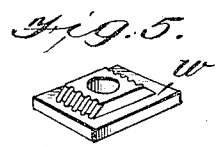
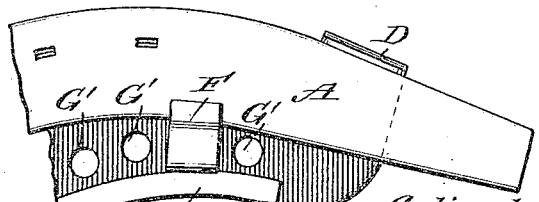
WITNESSES
INVENTOR
Arlington L. Hardisty
by Edw. W. Byrn.
Attorney

UNITED STATES PATENT OFFICE.

ARLINGTON L. HARDISTY, OF SILVER SPRING, MARYLAND.

ANTISLIPPING OVERSHOE FOR HORSES.

1,023,845. Specification of Letters Patent. Patented Apr. 23, 1912.

Application filed December 18, 1911. Serial No. 666,385.

*To all whom it may concern:*

Be it known that I, ARLINGTON L. HARDISTY, a citizen of the United States, residing at Silver Spring, in the county of Montgomery and State of Maryland, have invented certain new and useful Improvements in Antislipping Overshoes for Horses, of which the following is a specification.

My invention relates to overshoes for horses of that kind which are designed to be detachably applied to the ordinary horse shoe nailed on the horse's hoof, for the purpose of providing an easy and quickly applied anti-slipping attachment, or for holding any other form of attachment to the shoe on the horse's hoof. It is an improvement upon that form of such overshoes which is made in two hinged sections adapted to be expanded or contracted to suit the varying sizes or shapes of horse shoes, and which are secured by fastening devices which engage with the horseshoe already on the horse's hoof.

My improvement consists in the novel form and construction of the overshoe and novel means for connecting it to the horseshoe in a simple, convenient and practical way, which is not liable to become loose or detached and which may be applied by the driver or anybody else, without requiring the services of a blacksmith, as will be hereinafter more fully described with reference to the drawing in which—

Figure 1, is a top plan view of the usual horseshoe with my invention shown applied to the underside of the same, a part of the horseshoe being broken away. Fig. 2, is a view of the same parts, the view being taken from the underside next to the ground. Fig. 3, is a vertical longitudinal section of the same parts and also through a portion of the horse's hoof. Fig. 4, is a cross section taken through the line 4—4 of Fig. 1, beside one of the holding bolts. Fig. 5 is a detail of the locking washer of the holding bolts and, Fig. 6, is a detail showing a slight modification.

Similar letters of reference indicate the same parts in all the views.

In the drawing A represents the ordinary horseshoe as nailed upon the horse's hoof in the usual way, to which my overshoe is applied.

B B represent the two halves of my overshoe, which are made substantially alike and which are hinged together near the toe part at $b$, so as to permit them to be expanded or drawn together to fit the varying sizes and forms of horseshoe found on different horses or mules. The hinged overshoe sections are each of unitary character, that is to say, are made in one piece extending substantially from toe to heel of the horseshoe.

Each overshoe section is made by drop forging or casting from steel and is formed along its outer edge with two upwardly extending lips or flanges C and D. The forward one of these, C, is arranged near the toe and extends upwardly a greater distance than the rear one, so as to extend up not only above the outer edge of the shoe, but also some distance up along the front surface of the horse's hoof and it is canted slightly inwardly at the top and is made thin enough to permit it to be still further bent inwardly, by a blow from a hammer, to cause it to more tightly fit against and closely hug the outer angle of the horse's hoof, which varies somewhat in different horses. The other upwardly extending flange, D, is situated at or near the rear of the overshoe and is arranged to hug and closely fit the outer edge of the rear portion of the shoe. This flange is also slightly canted inwardly.

To hold the two hinged sections of the overshoe tightly and rigidly to the horseshoe, so that they cannot become disconnected therefrom, there is a toe locking member E and two heel locking bolts F F, one bolt on each side, and all of these locking devices are on the inside portions of the overshoe and are adapted to overlap and engage the upper inside edge of the horseshoe.

When the overshoe is applied exteriorly to the shoe on the horse's hoof, the two sections of the overshoe are pressed inwardly toward each other until the two exterior flanges, C, D, on each side, are solidly against the outside edge of the shoe and horse's hoof and then the toe locking member E and heel locking bolts F F are adjusted to the inside edges of the horse's shoe and, by means of an overlapping flange $e$ on the toe lock and an overlapping flange $f$ on the head of each bolt, the locking devices engage the upper surface of the inside edge of the shoe and prevent the overshoe from coming off. These locking devices are of special and important construction, which I will now describe as follows: The toe locking member E has a cam face where it bears against the inner edge of the shoe and an overlapping flange $e$ extending forwardly beyond the cam face and extending into the shallow horizontal space between the top of the shoe and the bottom of the horse's hoof, so as to lap over the top surface of the inner edge of the shoe in the shallow space referred to. Through the toe locking member E there extends a screw threaded hole into which is inserted the screw threaded end of a headed bolt $E^1$ whose shank extends through larger slots in the lapped edges of the inner wings of the overshoe sections and this bolt has a rigid head on the lower side next to the ground and between the head and the faces of the wings of the overshoe sections there is interposed a washer $E^2$. The face of this washer where it engages the face of the wings of the overshoe sections, and also the outer faces of the wings themselves, are serrated with interlocking corrugations, as seen at $x$ Fig. 2, so that said washer and bolt when tightened up cannot slip to the rear. In like manner the head of the bolt itself, and the washer, may have interlocking serrations, as seen at $y$, so that the bolt cannot turn. The toe locking member E is also formed with an offsetting rigid arm $e^1$ Fig. 1, whose end is bent down at right angles and is extended through a curved slot $e^2$ in the wing of the overshoe section, and on the outer side has a head $e^3$. This offsetting arm in the slot $e^2$ helps to hold and guide the locking member in its adjustment and holds it in place against accidental loosening.

In each inner wing portion of the overshoe section is formed a curved slot G and the inner edge of such curved slot is reinforced or made much thicker vertically, as shown at $c$, than the body portion of the overshoe on which the shoe rests. Through such slot on each side there passes a locking bolt F whose head has the overlapping flange $f$ engaging the inner edge of the shoe and extending above the same and projecting outwardly between the shallow space between the shoe and the horse's hoof. These bolts have each a nut $d$ on its lower end below the body of the overshoe and between said nut and the body of the overshoe is a washer $w$ of special construction as seen in Figs. 4 and 5. Such washer on the side next to the overshoe is of a somewhat wedge shape and penetrates the slot whose edges are beveled and serrated as seen in Fig. 2, the wedge shaped washer being also serrated, so that when the washer is forced into the slot and held there by the nut, the serrations on the washer interlock with those along the edges of the slot and prevent the bolt from sliding longitudinally in the slot. The head of the bolt F is square in cross section and lies between the inner edge of the shoe and the reinforced thickened side $c$ of the slot, as seen in Figs. 1 and 4. This serves a double purpose. First, it prevents the bolt from turning axially, which prevents the flange $f$ of the bolt from turning away from its overlapping position above the shoe, and second as the thickened reinforced portion $c$ is above the plane of the overshoe body and near the top of the bolt it forms a solid back bearing for the bolt head at its upper end to hold it more strongly up to its locking position against the inner edge of the horse shoe. The slots G G, which form seats for the bolts, are arranged in longitudinal position in relation to the sides of the overshoe sections and at an angle to the longitudinal axis of the shoe, which angle may vary in degree, so long as one end of said slot is closer to the inner edge of the shoe than the other end.

The slots G G approach each other at their forward ends and they also serve a double purpose in that they allow the bolts to be adjusted forward and backward to suit the size or shape of the shoe and also adapt my invention to shoes which have a greater or less cross sectional width. This together with the hinged character of the overshoe sections adapts the device to all sizes, forms and shapes of shoes. Furthermore it will be seen that these bolts are adapted to thin or thick shoes, or shoes half worn out, as in such case the nuts will draw the bolt heads down to any thickness of shoe.

The devices as thus described form a strong and sufficient connection of the overshoe to the usual horseshoe, but if desired there may be a strap with a buckle extending across the front of the horse's hoof whose ends are connected by rivets to the front flanges C C, as shown in dotted lines in Fig. 3. On the inner side or top face of the overshoe sections there is formed in each half a crease or "fuller" $g$, see Fig. 1, which coincides exactly with the outside nail crease of the horseshoe and which crease $g$ is designed to receive the projecting nail heads of new shoes, so that my overshoe may fit flatly against the lower face of the horseshoe if the nail heads of the latter should not be worn off.

In my invention the lower face of my overshoe is to be provided with toe and heel calks $h$ $k$ and these may be either formed permanently on the overshoe, or be detachable therefrom by any of the well known methods. At the toe portion of the overshoe sections there are two rigid lugs $l$ $l$, arranged transversely to the line of travel, which give a sufficient thickness for a strong pivotal connection for the hinged overshoe sections and also a sufficient body of material to hold the permanent or detachable toe calks which are applied thereto As a modification of my invention, I may, instead of using a slot G, employ simply a series of holes G¹ in the overshoe, see Fig. 6, through which the bolts pass and in any one of which the bolts may be adjusted, but I prefer the continuous slot, as it permits the bolts to be more quickly fitted to their locking position without taking the bolt out and fitting it into another hole.

It will be seen that my overshoe is a little short of the toe of the shoe and also a little short of the heels, so that when applied to shoes that have rough shod toes or heels, the roughened toe of the shoe will project down in front of my overshoe and the roughened heels will project down in rear of my overshoe.

I claim,

1. An overshoe attachment comprising two unitary side sections hinged at the toe about a vertical axis and having on the outer edge upturned flanges adapted to engage the outer edge of the horse's shoe and hoof, a toe locking member attached to the overshoe inside the horse's shoe and adapted to be projected against the inner edge of the shoe and locking bolts with overlapping heads arranged in the rear part of the hinged unitary overshoe sections inside the rear portions of the horse shoe and adapted to engage the inner, upper edge of the shoe, and means for adjusting said bolts in the unitary side sections longitudinally along the inner edges of the shoe.

2. An overshoe attachment having on its outer edges upturned flanges adapted to engage the outer edge of the horse's shoe and hoof, a toe locking member arranged in the overshoe inside the horse shoe and adjustable to and from the shoe, said toe locking member having a flange adapted to penetrate the space between horse shoe and hoof, an axial tightening bolt for the toe locking member, a rigid offsetting arm for said member and a guide in the overshoe for holding said arm.

3. An overshoe attachment having on its outer edges upturned flanges adapted to engage the outer edge of the horse's shoe and hoof, a toe locking member arranged in the overshoe inside the horse shoe and adjustable to and from the shoe, said toe locking member having a flange adapted to penetrate the space between horse shoe and hoof, an axial tightening bolt for the toe locking member, a rigid offsetting arm for said member and a guide in the overshoe for holding said arm, said guide being formed by a slot in the overshoe and the arm being bent and extended through said slots and provided with a retaining head.

4. An overshoe attachment having on its outer edges upturned flanges adapted to engage the outer edge of the horse's shoe and hoof, a toe locking member arranged in the overshoe inside the horse shoe and adjustable to and from the shoe, said toe locking member having a flange adapted to penetrate the space between horse shoe and hoof, an axial tightening bolt for the toe locking member, a rigid offsetting arm for said member and a guide in the overshoe for holding said arm, a washer between the head of the bolt and the overshoe and the adjacent faces of the washer and overshoe being serrated to interlock.

5. An overshoe attachment having on its outer edges, upturned flanges, a toe locking member arranged in the overshoe inside the horseshoe and adjustable to and from the shoe, an axial tightening bolt, a rigid offsetting stay arm for the toe locking member engaging the overshoe at one side of the axial bolt.

6. An overshoe attachment having on its outer edges upturned flanges, a toe locking member consisting of a rotary adjustable and flanged cam arranged in the overshoe inside the horseshoe, a headed axial bolt for clamping the said locking member and interlocking serrations arranged between the head of the bolt and the overshoe to prevent loosening of the locking member when tightened up.

7. An overshoe attachment made in two hinged sections having upturned flanges on their outer edges, a toe locking device at the front and locking devices for the sides at the rear consisting of openings in the overshoe sections, bolts passing through said openings and having heads adapted to overlap the inner edges of the shoe, said openings being formed on the inner side behind the bolts with a greater depth of metal to reinforce and hold the heads of the bolts to place.

8. An overshoe attachment having upturned flanges on its outer edges and having its innerside portions formed with slots inside the inner curve of the horseshoe and extending longitudinally along the side thereof, headed bolts arranged in these slots and made adjustable therein forwardly or backwardly and means for tightening and locking the bolts.

9. An overshoe attachment having upturned flanges on its outer edges and having its inner side portions formed with slots, headed bolts arranged in these slots and made adjustable therein forwardly or backwardly and means for tightening and locking the bolts consisting of beveled and serrated faces along the outer sides of the slots, washers having corresponding interlocking faces and nuts on the ends of the bolts adapted to clamp the bolt and interlock with the washer.

10. An overshoe having means on the outer edge of the same for engaging the exterior of the hoof and having its inner side portions extended inside the inner edge of the shoe and provided with longitudinally arranged openings, headed bolts arranged within these openings and made adjustable forward or backward and means for tightening and locking the bolts, the inner edges of the openings being reinforced and abutting against the bolts to form a back bearing for the same.

11. An overshoe, comprising two side sections hinged at the toe about a vertical axis and each made in one piece extending substantially from toe to heel of the horseshoe, said side sections having on the outer edges means for engaging the exterior of the horse's hoof and having their inner rear portions extending inside the rear inner edges of the shoe and provided with bolt seats, arranged at an angle to the longitudinal axis of the shoe, headed bolts arranged within these bolt seats and adjustable to or from the rear portions of the horseshoe to coöperate with the adjustment of the overshoe sections about the toe hinge, and means for locking the bolts.

In testimony whereof I affix my signature in presence of two witnesses.

ARLINGTON L. HARDISTY.

Witnesses:
J. MIDDLETON,
PERRY B. TURPIN.